(12) United States Patent
Blitzer et al.

(10) Patent No.: US 8,762,662 B1
(45) Date of Patent: Jun. 24, 2014

(54) METHOD AND APPARATUS FOR APPLICATION MIGRATION VALIDATION

(75) Inventors: Aharon Blitzer, Shoham (IL); Aviram Katz, Kiryat Onno (IL); David Barta, West Roxbury, MA (US)

(73) Assignee: EMC Corporation, Hopkinton, MA (US)

( * ) Notice: Subject to any disclaimer, the term of this patent is extended or adjusted under 35 U.S.C. 154(b) by 183 days.

(21) Appl. No.: 13/168,593

(22) Filed: Jun. 24, 2011

(51) Int. Cl.
*G06F 12/00* (2006.01)

(52) U.S. Cl.
USPC ........... 711/161; 711/114; 711/162; 711/165; 711/170; 711/E12.001

(58) Field of Classification Search
USPC ........... 711/114, 161–162, 165, 170, E12.001
See application file for complete search history.

(56) References Cited

U.S. PATENT DOCUMENTS

2009/0241100 A1* 9/2009 Sakurai et al. ................ 717/170

* cited by examiner

Primary Examiner — Jasmine Song

(74) *Attorney, Agent, or Firm* — Krishnendu Gupta; Gerald P. Kazanjian

(57) ABSTRACT

Example embodiments of the present invention provide a method, apparatus and computer-program product for application migration validation. In short, example embodiments of the present invention provide a tool to be run by an administrator prior to migration to determine a pre-migration policy. The administrator then performs the migration. After the migration is complete, the administrator runs to tool again to determine a post-migration policy. The tool then validates the post-migration policy. For example, the tool may compare the pre-migration policy and the post-migration police to determine whether there are differences between the pre-migration policy and the post-migration policy. Alternatively, the tool may compare the post-migration policy against a changed policy, different from the pre-migration policy, deliberately implemented by the administrator. The tool may alert on differences between the pre-migration policy and the desired post-migration policy (i.e., a properly migrated pre-migration policy or a new policy different than the pre-migration policy).

15 Claims, 7 Drawing Sheets

US 8,762,662 B1

METHOD AND APPARATUS FOR APPLICATION MIGRATION VALIDATION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application generally relates to data storage, and more particularly to techniques used in connection with an implemented data protection policy.

BACKGROUND

Data migration is the process of transferring data between storage types, formats, or computer systems. Data migration is typically required when organizations or individuals change computer systems or upgrade to new systems, or when systems merge, such as when the organizations that use them undergo a merger or takeover.

To achieve an effective data migration procedure, data on the old (i.e., source) system is mapped to the new (i.e., target) system providing a design for data extraction and data loading. The design relates old data formats to the new system's formats and requirements. Programmatic data migration may involve many phases but it minimally includes data extraction where data is read from the old system and data loading where data is written to the new system.

After loading into the new system, results are subjected to data verification to determine whether data was accurately translated, is complete, and supports processes in the new system. During verification, there may be a need for a parallel run of both systems to identify areas of disparity and forestall erroneous data loss.

SUMMARY

Example embodiments of the present invention provide a method, apparatus and computer-program product for migration validation comprising. The method includes retrieving a pre-migration policy and retrieving a post-migration policy. The post-migration policy is then validated according to the pre-migration policy.

BRIEF DESCRIPTION OF THE DRAWINGS

The above and further advantages of the present invention may be better under stood by referring to the following description taken into conjunction with the accompanying drawings in which.

DETAILED DESCRIPTION

Figure 1:
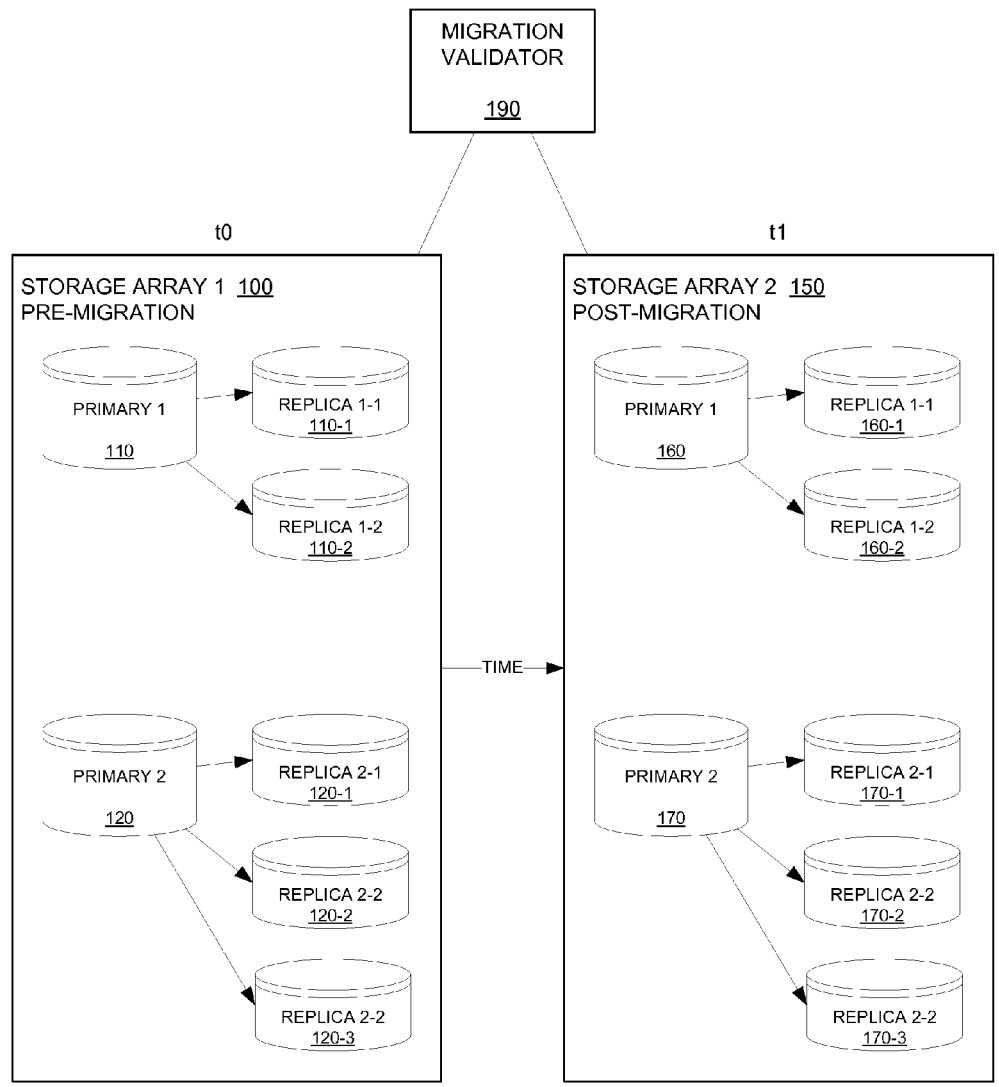
FIGS. 1-4 are block diagrams illustrating migration of a replication service from a first storage array to a second storage array according to example embodiments of the present invention.

The migration process is one of the most complicated processes of storage administration and is susceptible to high degrees of administrator error. For example, an administrator may not perform a full migration (i.e., may forget to migrate some data) or may not provision target devices as source devices were provisioned or, alternatively, as required by new organizational requirements (i.e., may not provision the target devices according to a policy in effect at the source devices or a new policy required by the organization t which the data belongs).

Data protection may be provided by a data protection process that makes a copy of an original set of data at the target devices. The copy of data may be used upon the occurrence of an event causing data failure such as may occur, for example, when the original copy of data is destroyed, corrupted, or otherwise unavailable. Different strategies may be used to provide data protection for different types of failures that can occur. A data protection policy (DPP) may be designed to meet data protection criteria or objectives determined in a variety of different ways. Such criteria may be specified in a service level agreement (SLA), by management or administrators, and the like. Once designed, the DPP may then be implemented.

It is certainly an important task to copy the information from source devices to target devices accurately, and data verification provides an important function in the migration process by determining whether that data was accurately translated and loaded at the target devices. However, it is also important to protect that data at the target devices at appropriate service levels as required by data protection policies of the organization to which the data belongs, such as those implemented at the source devices or a new required policy.

For an application installed on a source storage device (e.g., a storage array), such as those by EMC Corporation of Hopkinton, Mass., that an administrator needs to migrate to a target storage device, it would be beneficial to the administrator to ensure that two important factors will be considered during the migration process: (1) data protection policies; and (2) performance.

It is important that a data protection policy in effect at the source devices (i.e., pre-migration policy) is also in effect at the target devices (i.e., post-migration policy) or, alternatively, that a new data protection policy required by the organization in effect at the target devices (i.e., post-migration policy) properly replaces the policy at the source devices. Therefore, the data protection policy will not change as a result of the migration process, unless it is a deliberate change required by the organization which is explicitly made known during the migration process.

For example, if there is a synchronous replication service available at the source devices, when migrating to the target devices, example embodiments of the present invention provide validation of the policy in effect at the target devices after the migration to determine whether the synchronous replication service is available at the target devices. However, if an administrator was instructed during the migration process that the replication service should be asynchronous following the migration, example embodiments of the present invention will determine whether the asynchronous service is available.

Further, it is important for application performance to be maintained after migration. For example, if an application had a specific performance attribute at the source devices (e.g., it runs on Symmetrix storage platform by EMC Corporation of Hopkinton, Mass. or has certain performance capabilities), it would be beneficial for an administrator to be assured that the target devices support the same, if not better, performance post migration as the source devices prior to migration.

Accordingly, example embodiments of the present invention address this need by providing a method, apparatus and computer-program product for application migration validation. In short, example embodiments of the present invention provide a tool to be run by an administrator prior to migration to determine a pre-migration policy. The administrator then performs the migration. After the migration is complete, the administrator runs to tool again to determine a post-migration policy. The tool then validates the post-migration policy. For example, the tool may compare the pre-migration policy and the post-migration police to determine whether there are differences between the pre-migration policy and the post-migration policy. Alternatively, the tool may compare the post-migration policy against a changed policy, different from the pre-migration policy, deliberately implemented by the administrator. In both scenarios, the tool may alert on differences between the pre-migration policy and the desired post-migration policy (i.e., a properly migrated pre-migration policy or a new policy different than the pre-migration policy).

FIGS. 1-4 are block diagrams illustrating validation of migration of a replication service from a first storage array (i.e., storage array 1) 100 to a second storage array (i.e., storage array 2) 150 according to four example embodiments of the present invention. A migration validator 190 is also provided for validating the migration of the replication service at the first storage array 100 to the second storage array 150. It should be understood that the migration of the replication service from the first storage array 100 to the second storage array 150 occurs over time from time t0 to time t1, as indicated by the horizontal arrow labeled "TIME" connecting the first storage array 100 to the second storage array 150.

Figure 4:
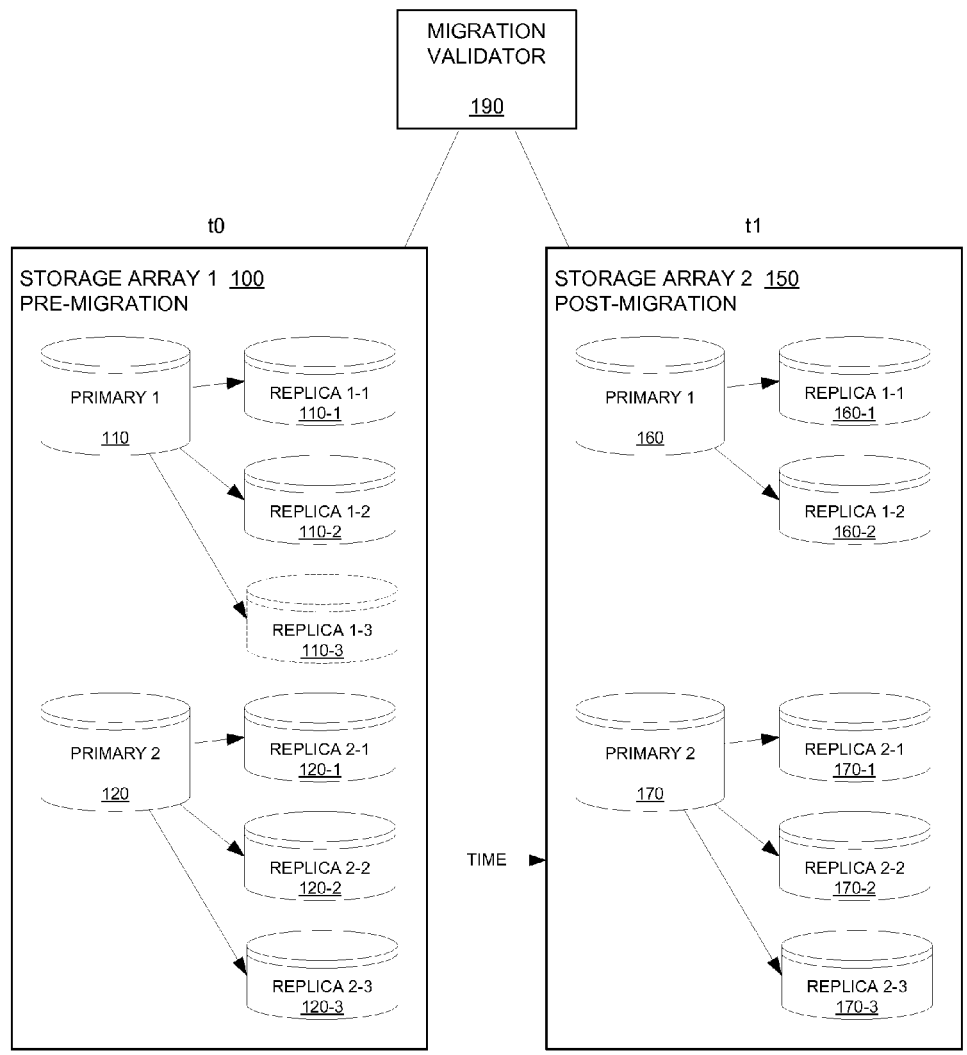
Figure 5:
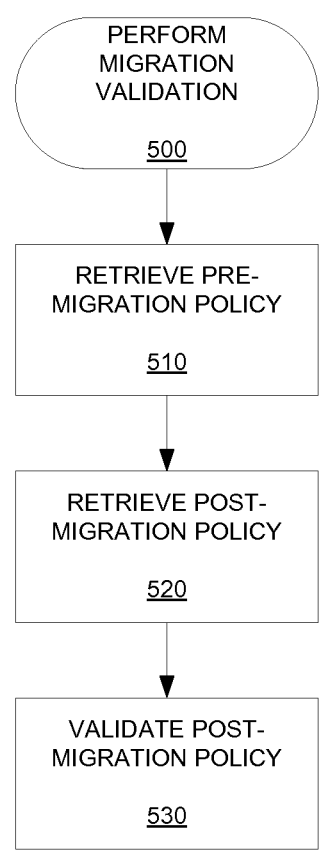
FIGS. 5-6 are flow diagrams illustrating migration validation according to example embodiments of the present invention.
Figure 6:
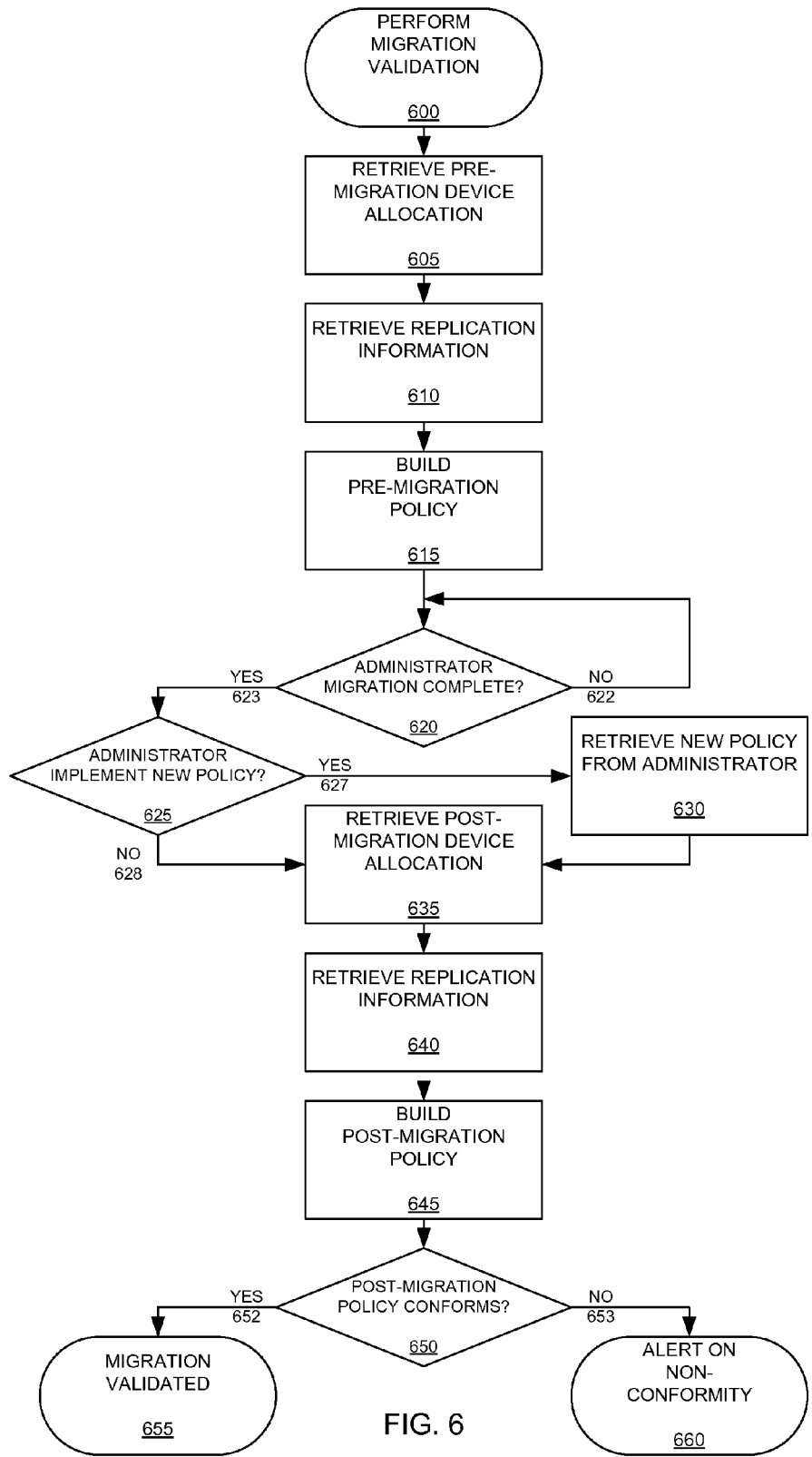

The description below of the block diagrams of FIGS. 1-4 includes a description of the flow diagrams of FIGS. 5-6, with the flow elements of FIGS. 5-6 presented in parentheses. Therefore, the description below of FIGS. 1-4 is intended to be read in conjunction with the study of the flow diagrams of FIGS. 5-6 illustrating migration validation according to example embodiments of the present invention. Common to FIGS. 1-4 is the illustration of the replication service at time t0 including a replication of a first primary disk (i.e., primary 1) 110 to two replicas (i.e., replica 1-1 and replica 1-2) 110-1, 110-2 and a replication of a second primary disk (i.e., primary 2) 120 to three replicas (i.e., replica 2-1, replica 2-2 and replica 2-3) 120-1, 120-2, 120-3.

As illustrated in FIGS. 1-4, prior to the migration of the replication service from the first storage array 100 to the second storage array 150, the migration validator 190 may begin the migration validation process (500), (600) and retrieve a pre-migration policy from the first storage array 100 (510). For example, the migration validator 190 may retrieve from the array 100 device allocation information (605), including device information and metrics such as performance tiers required by the replication service (i.e., the application), disk type and performance attributes. The device allocation information also may be retrieved from a data protection policy or from data protection rules.

The migration validator 190 also may retrieve replication information (610). Replication information may include policies, such as disaster recovery, operational recovery and logical corruption recovery policies; and policy attributes, such as recovery policy objective (RPO), recovery time objective (RTO), number of copies and location. Replication information also may include protection rules regarding a list of replications (i.e., replica 1-1 and replica 1-2 of primary 1) including the number of copies, the type of replication (i.e., Symmetrix Remote Data Facility (SRDF) or RecoveryPoint, both by EMC Corporation of Hopkinton, Mass.), the mode of replication (i.e., synchronous, asynchronous, continuous data protection (CDP), point in time (PIT)), source engine type and target engine type (i.e., Symmetrix or VNX, both by EMC Corporation of Hopkinton, Mass.), location, RPO and RTO. The replication information may be retrieved from the first storage array 100, a replication system (i.e., service), a replication product (not shown) and a user (e.g., an administrator) of the migration validator 190 or of the replication service as a policy or as a set of replication jobs.

In FIGS. 1-4, having retrieved the pre-migration device allocation information and retrieved the pre-migration replication information, the migration validator 190 then may build the pre-migration replication policy in effect at the first storage array 100 according to the device allocation information and the replication information (615). Methods for building policies are described in U.S. Pat. No. 7,840,595, entitled "TECHNIQUES FOR DETERMINING AN IMPLEMENTED DATA PROTECTION POLICY," to Blitzer et al. and assigned to EMC Corporation of Hopkinton, Mass.

An administrator then may perform the migration. As will become clear below, the administrator may implement the same data protection policy at the target as was in place at the source, or may adjust the required policy to reflect a new policy should it be different. The migration validator 190 may determine whether the migration is complete (620), such as by determining whether the migration validator 190 has received a notification from the administrator that the migration is complete. If the migration is not yet complete (622), the migration validator waits. However, if the migration is complete (623), the migration validator 190 continues.

FIG. 1 is a block diagram illustrating validation of migration of a replication service according to a first example embodiment of the present invention. After the migration of the replication service from the first storage array 100 to the second storage array 150 in FIG. 1, at time t1 the replication service includes a replication of a first primary disk (i.e., primary 1) 160 to two replicas (i.e., replica 1-1 and replica 1-2) 160-1, 160-2 and a replication of a second primary disk (i.e., primary 2) 170 to three replicas (i.e., replica 2-1, replica 2-2 and replica 2-3) 170-1, 170-2, 170-3. Thus, the replication service at the second storage array 150 at time t1 is identical to the replication service at the first storage array 100 at time t0.

The migration validator 190 then may retrieve a post-migration policy from the second storage array 150 (520). For example, the migration validator 190 may retrieve from the array 150 device allocation information and performance information (635), as described above with respect to the retrieval of the pre-migration policy. The migration validator 190 also may retrieve replication information (640), as described above with respect to the retrieval of the pre-migration policy.

Having retrieved the post-migration device allocation information and performance information and retrieved the post-migration replication information, the migration validator 190 then may build the post-migration replication policy in effect at the second storage array 150 according to the device allocation information and the replication information (645).

The migration validator 190 now may validate the post-migration policy according to the pre-migration policy (520). To validate the post-migration policy according to the pre-migration policy, the migration validator 190 may determine whether the post-migration policy conforms to a desired state (650). The desired post-migration state of FIG. 1 is a post-migration policy that is identical to the pre-migration policy. As described above, the replication service at the second storage array 150 at time t1 is identical to the replication service at the first storage array 100 at time t0. Thus, the post-migration policy conforms with the pre-migration policy (652). Therefore, the migration of FIG. 1 is validated by the migration validator 190 (655). Additionally, the migration validator 190 may check that performance attributes have not changed (e.g., disk type and performance tier).

Figure 2:
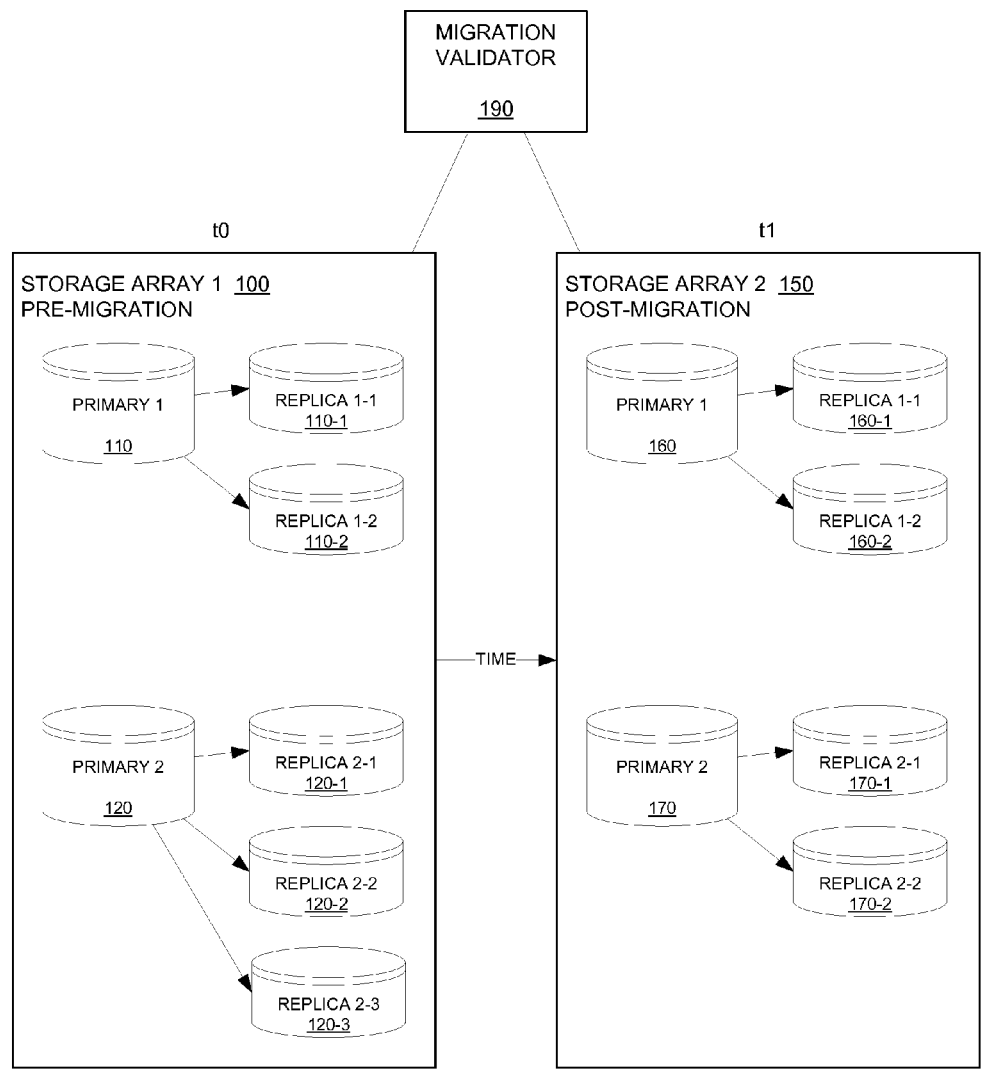

FIG. 2 is a block diagram illustrating validation of migration of a replication service according to a second example embodiment of the present invention. After the migration of the replication service from the first storage array 100 to the second storage array 150 in FIG. 2, at time t1 the replication service includes a replication of a first primary disk (i.e., primary 1) 160 to two replicas (i.e., replica 1-1 and replica 1-2) 160-1, 160-2 and a replication of a second primary disk (i.e., primary 2) 170 to two replicas (i.e., replica 2-1 and replica 2-2) 170-1, 170-2. Thus, replica 2-3 170-3 is missing from the replication service at the second storage array 150 at time t1.

The migration validator 190 then may retrieve a post-migration policy from the second storage array 150 (520). For example, the migration validator 190 may retrieve from the array 150 device allocation information and performance information (635), as described above with respect to the retrieval of the pre-migration policy. The migration validator 190 also may retrieve replication information (640), as described above with respect to the retrieval of the pre-migration policy.

Having retrieved the post-migration device allocation information and performance information and retrieved the post-migration replication information, the migration validator 190 then may build the post-migration replication policy in effect at the second storage array 150 according to the device allocation information and the replication information (645).

The migration validator 190 now may validate the post-migration policy according to the pre-migration policy (520). To validate the post-migration policy according to the pre-migration policy, the migration validator 190 may determine whether the post-migration policy conforms to a desired state (650). The desired post-migration state of FIG. 2 is a post-migration policy that is identical to the pre-migration policy. As described above, replica 2-3 170-3 is missing from the replication service at the second storage array 150 at time t1. Thus, the replication service at the second storage array 150 at time t1 is noncompliant with the replication service at the first storage array 100 at time t0 (653). The noncompliance may be a result of administrator error or device failure. Therefore, the migration of FIG. 2 is determined to be noncompliant by the migration validator 190 which may alert on the nonconformity (660). Additionally, the migration validator 190 may check that performance attributes have not changed (e.g., disk type and performance tier).

Figure 3:
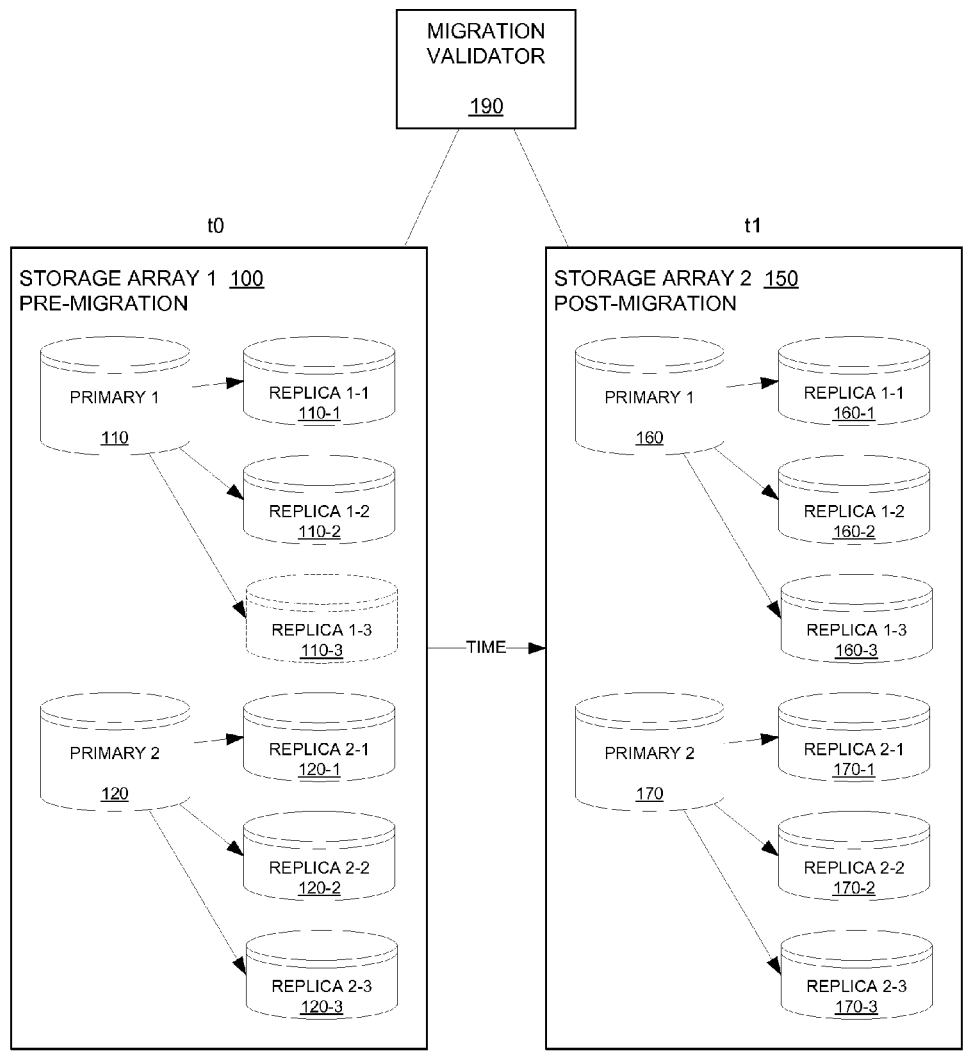

FIG. 3 is a block diagram illustrating validation of migration of a replication service according to a third example embodiment of the present invention. However, as illustrated at the first storage array 100 of FIG. 3, an administrator desires that the replication service at time t0 includes a third replica 1-3 110-3 of the first primary disk 110 (as indicated by the hashed illustration of the replica 1-3 110-3). The administrator may notify the migration validator 190 that the administrator has implemented a new policy at the second storage array 150.

Accordingly, the migration validator 190 determines whether the administrator has implemented a new policy at the second storage array 150 (625). If the administrator has implemented a new policy at the second storage array 150 (627), the migration validator 190 may retrieve the new policy from the administrator. For example, the migration validator 190 may retrieve the new policy from the administrator via a command line interface (CLI), application programming interface (API) or a graphical user interface (GUI).

After the migration of the replication service from the first storage array 100 to the second storage array 150 in FIG. 3, at time t1 the replication service includes a replication of a first primary disk (i.e., primary 1) 160 to three replicas (i.e., replica 1-1, replica 1-2 and replica 1-3) 160-1, 160-2, 160-3 and a replication of a second primary disk (i.e., primary 2) 170 to three replicas (i.e., replica 2-1, replica 2-2 and replica 2-3) 170-1, 170-2, 170-3. Thus, the replication service at the second storage array 150 at time t1 is differs from the replication service at the first storage array 100 at time t0. However, the replication service at the second storage array 150 at time t1 was provisioned according to the new policy desired by the administrator.

The migration validator 190 then may retrieve a post-migration policy from the second storage array 150 (520). For example, the migration validator 190 may retrieve from the array 150 device allocation information and performance information (635), as described above with respect to the retrieval of the pre-migration policy. The migration validator 190 also may retrieve replication information (640), as described above with respect to the retrieval of the pre-migration policy.

Having retrieved the post-migration device allocation information and performance information and retrieved the post-migration replication information, the migration validator 190 then may build the post-migration replication policy in effect at the second storage array 150 according to the device allocation information and the replication information (645).

The migration validator 190 now may validate the post-migration policy according to the new policy desired by the administrator (520). To validate the post-migration policy according to the new policy desired by the administrator, the migration validator 190 may determine whether the post-migration policy conforms to a desired state (650). The desired post-migration state of FIG. 3 is a post-migration policy that conforms to the post-migration policy desired by the administrator. As described above, the replication service at the second storage array 150 at time t1 was provisioned according to the post-migration policy desired by the administrator. Thus, the post-migration policy conforms with the new policy (652). Therefore, the migration of FIG. 3 is validated by the migration validator 190 (655). Additionally, the migration validator 190 may check that performance attributes have not changed (e.g., disk type and performance tier).

FIG. 4 is a block diagram illustrating validation of migration of a replication service according to a fourth example embodiment of the present invention. However, as illustrated at the first storage array 100 of FIG. 4, an administrator desires that the replication service at time t0 includes a third replica 1-3 110-3 of the first primary disk 110 (as indicated by the hashed illustration of the replica 1-3 110-3). The administrator may notify the migration validator 190 that the administrator has implemented a new policy at the second storage array 150.

Accordingly, the migration validator 190 determines whether the administrator has implemented a new policy at the second storage array 150 (625). If the administrator has implemented a new policy at the second storage array 150 (627), the migration validator 190 may retrieve the new policy from the administrator. For example, the migration validator 190 may retrieve the new policy from the administrator via a command line interface (CLI), application programming interface (API) or a graphical user interface (GUI).

After the migration of the replication service from the first storage array 100 to the second storage array 150 in FIG. 4, at time t1 the replication service includes a replication of a first primary disk (i.e., primary 1) 160 to two replicas (i.e., replica 1-1 and replica 1-2) 160-1, 160-2 and a replication of a second primary disk (i.e., primary 2) 170 to three replicas (i.e., replica 2-1, replica 2-2 and replica 2-3) 170-1, 170-2, 170-3. Thus, the replication service at the second storage array 150 at time t1 is identical to the replication service at the first storage array 100 at time t0. However, the replication service at the second storage array 150 at time t1 was not provisioned according to the new policy desired by the administrator.

The migration validator 190 then may retrieve a post-migration policy from the second storage array 150 (520). For example, the migration validator 190 may retrieve from the array 150 device allocation information and performance information (635), as described above with respect to the retrieval of the pre-migration policy. The migration validator 190 also may retrieve replication information (640), as described above with respect to the retrieval of the pre-migration policy.

Having retrieved the post-migration device allocation information and performance information and retrieved the post-migration replication information, the migration validator 190 then may build the post-migration replication policy in effect at the second storage array 150 according to the device allocation information and the replication information (645).

The migration validator 190 now may validate the post-migration policy according to the new policy desired by the administrator (520). To validate the post-migration policy according to the new policy desired by the administrator, the migration validator 190 may determine whether the post-migration policy conforms to a desired state (650). The desired post-migration state of FIG. 4 is a post-migration policy that is identical to the new policy desired by the administrator. As described above, the replication service at the second storage array 150 at time t1 is identical to the replication service at the first storage array 100 at time t0. Thus, the post-migration policy does not conform with the new policy desired by the administrator (653). The noncompliance may be a result of administrator error or device failure. Therefore, the migration of FIG. 2 is determined to be noncompliant by the migration validator 190 which may alert on the nonconformity (660). Additionally, the migration validator 190 may check that performance attributes have not changed (e.g., disk type and performance tier).

Figure 7:
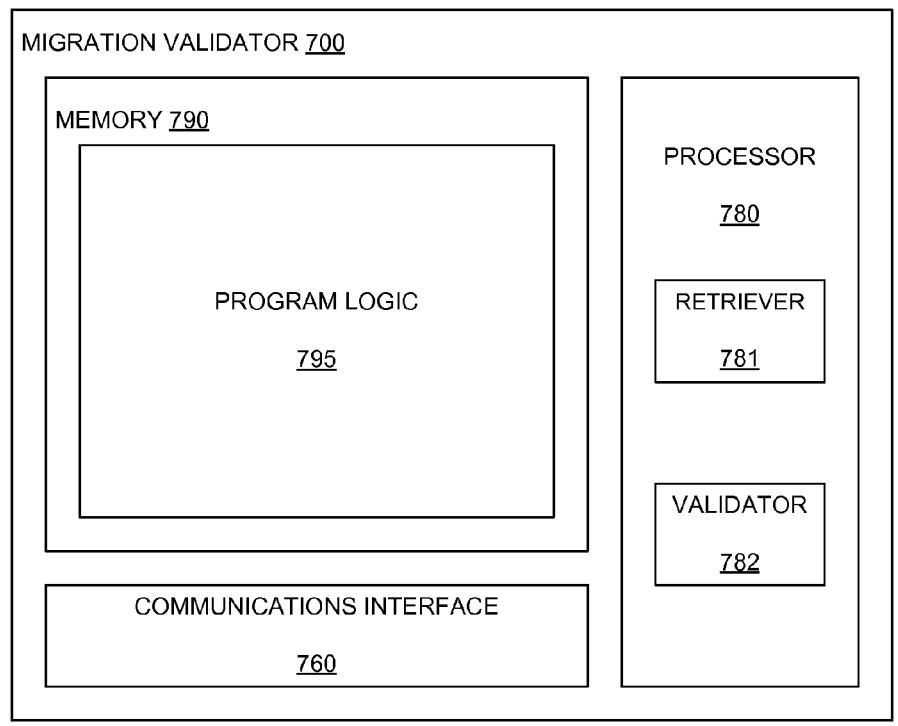
FIG. 7 is a block diagram of an example embodiment apparatus according to the present invention.

FIG. 7 is a block diagram of an example embodiment migration validator 700 according to the present invention. The migration validator 700 includes memory 790 storing program logic, a processor 780, a communications interface 760, a retriever 781 and a validator 782.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 7, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine.

Figure 8:
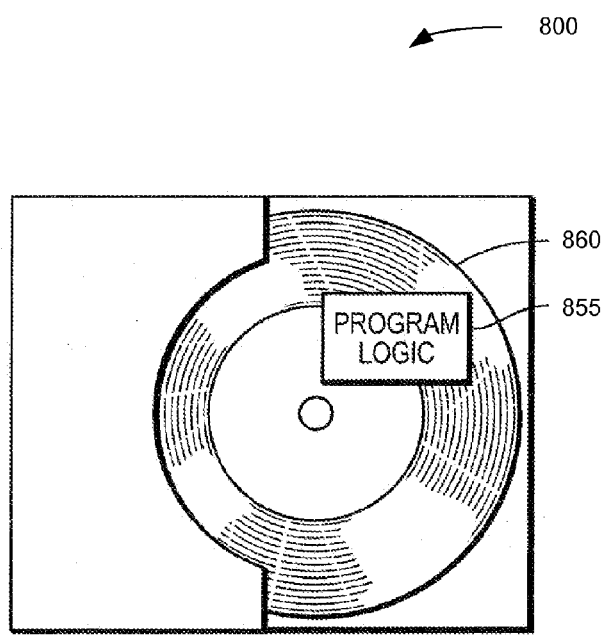
FIG. 8 is an illustration of an example embodiment of the present invention as embodied in program code.

FIG. 8 shows program logic 855 embodied on a computer-readable medium 860 as shown, and wherein the logic is encoded in computer-executable code configured for carrying out the migration validation process of this invention and thereby forming a computer program product 800.

The logic for carrying out the method may be embodied as part of the aforementioned system, which is useful for carrying out a method described with reference to embodiments shown in, for example, FIGS. 5-6. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for migration validation comprising:
    retrieving a pre-migration policy;
    retrieving a post-migration policy by receiving changes to the pre-migration policy, including device allocation information and replication information, from an administrator for incorporation in the post-migration policy; and
    validating the post-migration policy according to the pre-migration policy by determining whether the post-migration policy conforms with the pre-migration policy and the incorporated changes.

2. The method of claim 1 wherein at least one of retrieving a pre-migration policy and retrieving a post-migration policy comprises retrieving a current policy, comprising:
    retrieving device allocation information;
    retrieving replication information; and
    building the current policy according to the device allocation information and the replication information.

3. The method of claim 2 wherein retrieving device allocation information comprises retrieving application requirements, disk type information and performance attributes.

4. The method of claim 2 wherein retrieving replication information comprises retrieving the replication information from one or more of a storage array, a replication system, a replication product, a user as a policy and the user as a set of replication jobs.

5. The method of claim 1
wherein retrieving a pre-migration policy comprises retrieving a new policy from an administrator; and
wherein determining whether the post-migration policy conforms to a desired state comprises determining whether the post-migration policy conforms with the new policy received from the administrator.

6. An migration validator apparatus comprising:
a retriever configured to retrieve a pre-migration policy and retrieve a post-migration policy by receiving changes to the pre-migration policy, including device allocation information and replication information, from an administrator for incorporation in the post-migration policy; and
a validator configured to validate the post-migration policy according to the pre-migration policy by determining whether the post-migration policy conforms with the pre-migration policy and the incorporated changes.

7. The apparatus of claim 6 wherein the retriever is further configured to retrieve device allocation information, retrieve replication information and build the current policy according to the device allocation information and the replication information.

8. The apparatus of claim 7 wherein the retriever is further configured to retrieve application requirements, disk type information and performance attributes.

9. The apparatus of claim 7 wherein the retriever is further configured to retrieve the replication information from one or more of a storage array, a replication system, a replication product, an administrator as a policy and the administrator as a set of replication jobs.

10. The apparatus of claim 6
wherein the retriever is further configured to retrieve a new policy from an administrator; and
wherein the validator is further configured to determine whether the post-migration policy conforms with the new policy received from the administrator.

11. A computer-program product including a non-transitory computer-readable storage medium encoded with computer-program code that, when executed on a processor of a computer, cause the computer to perform migration validation, the computer-program code comprising:

computer-program code for retrieving a pre-migration policy;
computer-program code for retrieving a post-migration policy by receiving changes to the pre-migration policy, including device allocation information and replication information, from an administrator for incorporation in the post-migration policy; and
computer-program code for validating the post-migration policy according to the pre-migration policy by determining whether the post-migration policy conforms with the pre-migration policy and the incorporated changes.

12. The computer-program product of claim 11 wherein at least one of computer-program code for retrieving a pre-migration policy and computer-program code for retrieving a post-migration policy comprises retrieving a current policy, comprising:
computer-program code for retrieving device allocation information;
computer-program code for retrieving replication information; and
computer-program code for building the current policy according to the device allocation information and the replication information.

13. The computer-program product of claim 11
wherein computer-program code for retrieving a pre-migration policy comprises computer-program code for retrieving a new policy from an administrator; and
wherein computer-program code for determining whether the post-migration policy conforms to a desired state comprises computer-program code for determining whether the post-migration policy conforms with the new policy received from the administrator.

14. The computer-program product of claim 12 wherein computer program code for retrieving device allocation information comprises computer program code for retrieving application requirements, disk type information and performance attributes.

15. The computer-program product of claim 12 wherein computer program code for retrieving replication information comprises computer program code for retrieving the replication information from one or more of a storage array, a replication system, a replication product, a user as a policy and the user as a set of replication jobs.

* * * * *